June 30, 1964 R. S. DEAN 3,139,336
COPPER REFINING
Filed May 11, 1961
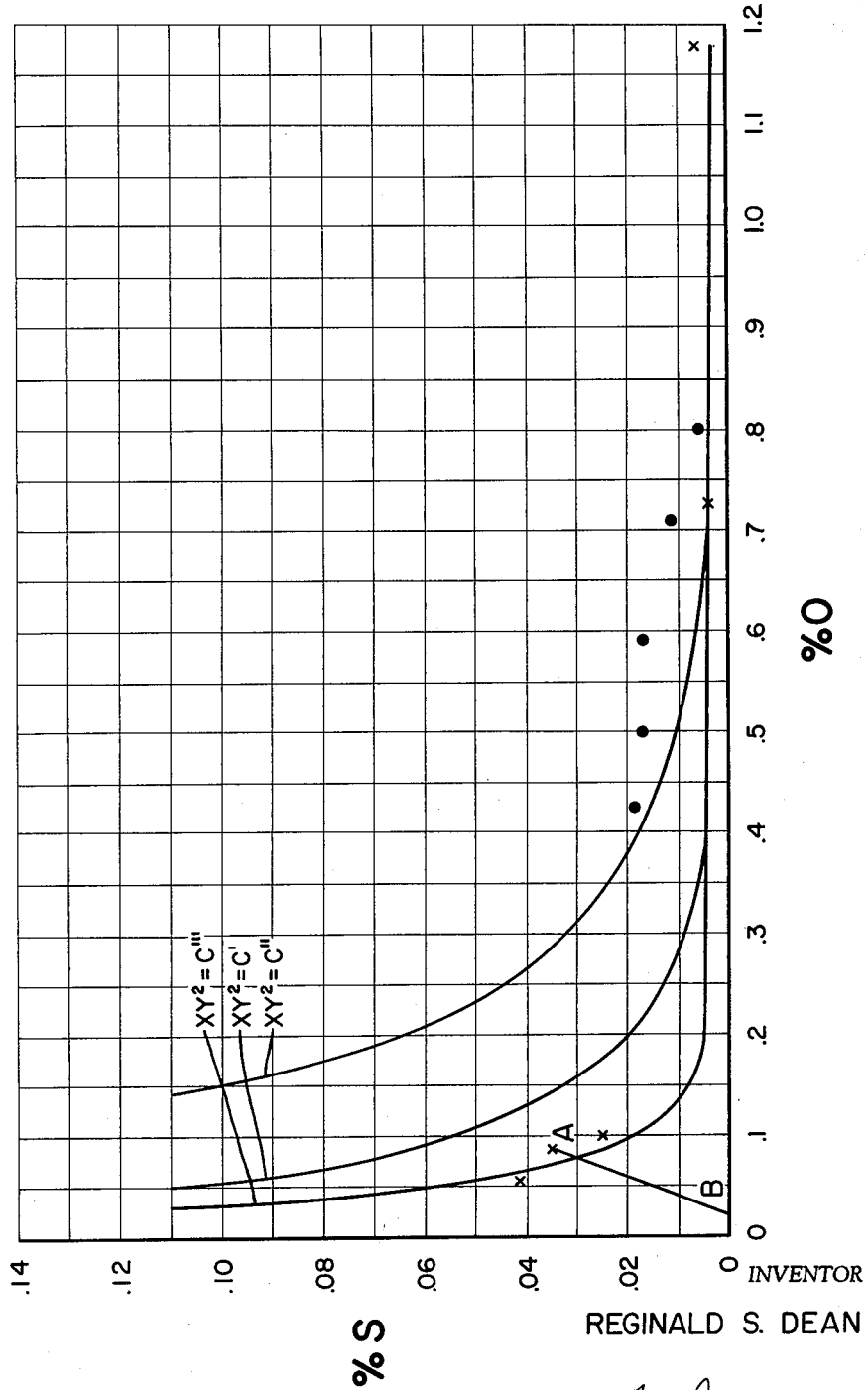
INVENTOR
REGINALD S. DEAN
BY John J. McLaughlin
ATTORNEY

United States Patent Office 3,139,336
Patented June 30, 1964

3,139,336
COPPER REFINING
Reginald S. Dean, Hyattsville, Md.; Mattie M. Dean, executrix of said Reginald S. Dean, deceased, assignor to John J. McLaughlin, Scottsdale, Ariz.
Filed May 11, 1961, Ser. No. 109,365
2 Claims. (Cl. 75—75)

This invention relates to the production of highly pure copper directly in the converter. It has for its object the production in the converter of copper which may be cast in anodes or other forms with a flat surface and without porosity.

My invention is an improvement in a process such as that of U.S. Patent No. 2,895,821, in which the impurities remaining in the copper at a certain stage of blowing are absorbed by adding silica to form a blanket rather than by continuing the blowing until the sulphur is removed by additional oxidation.

The continuing blowing in the converter after adding the silica is necessary to properly form the blanket but it also produces some further oxidation.

This limits the reaction of the sulphur and oxygen in the purified copper so that on solidifying some gas is still evolved.

It is the object of the present invention to further remove the sulphur and oxygen so that no gas will be evolved on solidification.

This is accomplished by reducing the partial pressure of $SO_2$ over the mass by carrying out the blowing immediately after the addition of silica with an inert gas like nitrogen or argon.

The figure will illustrate the distinction between my process and the prior art. In this figure the curves represent the equilibrium (1) S (in liquid copper)+2O (in liquid copper)⇌$SO_2$ which in mathematical form becomes $$[S] \times [O]^2 = KpSO_2$$

where [S] and [O] represent the concentrations of sulphur and oxygen in the liquid copper, $pSO_2$ is the effective partial pressure of $SO_2$ over the copper; while K is a constant depending most importantly on temperature. In plotting the curves in the figure a constant temperature of about 2150° F. has been assumed and the term [$KpSO_2$] has been taken as a single constant C', C" or C'". These curves are clearly of the form $XY^2=C$ and the curves shown are merely illustrative of a family of curves of this form. It must be emphasized that the curves are not drawn through the points shown but that each point would fall on one of the family of curves. The points shown as circles represent analyses of samples made by conventional converter practice, while the points shown as crosses represent analyses of samples made by adding silica to form a blanket in the converter at the late worm stage of blowing. If we consider any point on the plot the composition represented will move along one of the family of curves toward the right if oxygen is added by blowing, the composition will move along the same curve to the left if a reducing condition is produced as by adding sulphur or a reducing material.

If the effective partial pressure of $SO_2$ is reduced by blowing with an inert gas then reaction (1) above will proceed from left to right and the composition will change as illustrated by the line A–B in the plot.

To obtain good results by my invention, the percentage of S and O in the copper should be of the same order, that is the oxygen should not be more than 10 times the sulphur. It is preferable that they be more nearly of equal percentages. When this is the case the final oxygen will be no more than a few thousandths percent.

In carrying out my invention, the air blast should be discontinued and a nitrogen blast substitued immediately on adding the silica. In ordinary operation in a 100 ton Pierce Smith converter the total tuyere pressure as nitrogen is substituted and must not fall below 8 lbs. Blowing with nitrogen must be continued until the sulphur and oxygen are removed from the converter and the sulphur all removed from the molten copper. This condition will be revealed by a change in the flame at the mouth of the converter. When all the sulphur is removed there will be no further sparks.

It will be understood that my invention can be applied in the converter or other vessel in which the sulphur and oxygen contents are approximately those shown by crosses in the figure.

Example I

I take a charge of 75–100 tons of white metal in a Pierce Smith converter and proceed to skim and go on and finish in the usual manner. I add anode scrap and cold dope as required and continue blowing until clear copper is produced and temperature is approximately 2150° F. I then continue to blow until the criteria of a separating disperse liquid phase appear, namely breaking sparks and a rise in temperature on the pyrometer chart. At this time a spoon test will usually show worm going off. When these criteria appear, I substitute nitrogen for the air blowing through the tuyeres and immediately add 4 tons of silica by conveyer belt with the converter still in the stack. I continue the blow with nitrogen for 5 minutes and until sulphur sparks are no longer seen at the mouth of the converter. I then turn the converter out and pour from under the blanket which has formed. The copper is a new product which analyses less than .008% of either oxygen or sulphur and which shows no porosity on solidification and requires no further treatment for the casting of anodes or wire bars.

Example II

In this example, I proceed as in Example I except that I discontinue the air blow when the copper shows an equal percentage of oxygen and sulphur. Since sulphur in the copper is decreasing as the blow is continued and oxygen is increasing, there is a point where the two are approximately equal at about .03%. I determine this by a sample taken through the tuyeres and solidified on a steel rod then remelted in an inert arc furnace such as is used to make titanium buttons and solidified. The button obtained at this point has the maximum porosity due to gas evolution. I then immediately add the silica, stop the air blow and substitute argon and continue the blow for 5 minutes. I then turn the converter and pour the copper from under the blanket which was formed. It analyzes less than .002% of either sulphur or oxygen.

What is claimed is:

1. In a process of producing copper in a converter in which the impurities are absorbed into a silica blanket by adding silica near the end of the usual air blow and continuing the said air blow several minutes to form the blanket, the improvement in combination therewith which consists in substantially completely substituting inert gas for air at about the time the silica is added and continuing the blow with said inert gas for several minutes to form the blanket, and pouring the purified copper from under the blanket.

2. In a process of producing copper in a converter in which copper matte is oxidized to blister copper by blowing air through the molten mass in the converter, the steps of (a) continuing said air blow past the blister copper stage and approximately to the worm stage, (b) maintaining a temperature of the general order of 2150° F.,
(c) adding to the molten copper a substantial proportion of a silica flux material while continuing said blow to thereby form a blanket for absorbing impurities from the molten copper mass,
(d) replacing said air with an inert gas at about the time of addition of said silica flux,
(e) continuing said blow with said inert gas until said blanket has solidified and absorbed said impurities, and until a substantial proportion of $SO_2$ has been scavenged from the converter, and
(f) pouring the resulting purified copper out from under said blanket.

References Cited in the file of this patent

UNITED STATES PATENTS

| | | |
|---|---|---|
| 1,599,424 | Lellep | Sept. 14, 1926 |
| 1,623,797 | Lellep | Apr. 5, 1927 |
| 2,895,821 | Redmond | July 21, 1959 |
| 2,923,671 | Van Tilburg | Feb. 2, 1960 |